May 5, 1942.  P. F. JACKSON  2,282,189
FRONT WHEEL INDICATOR FOR MOTOR VEHICLES
Filed Feb. 6, 1940  2 Sheets-Sheet 1
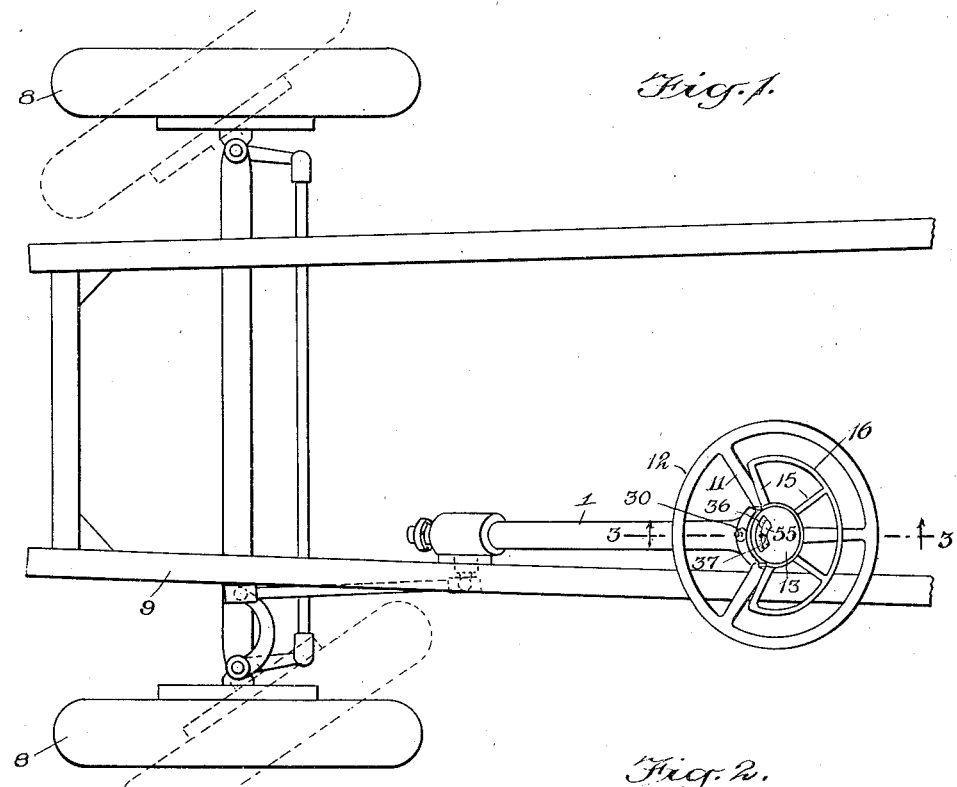
WITNESSES
INVENTOR
Philip F. Jackson
BY
ATTORNEYS

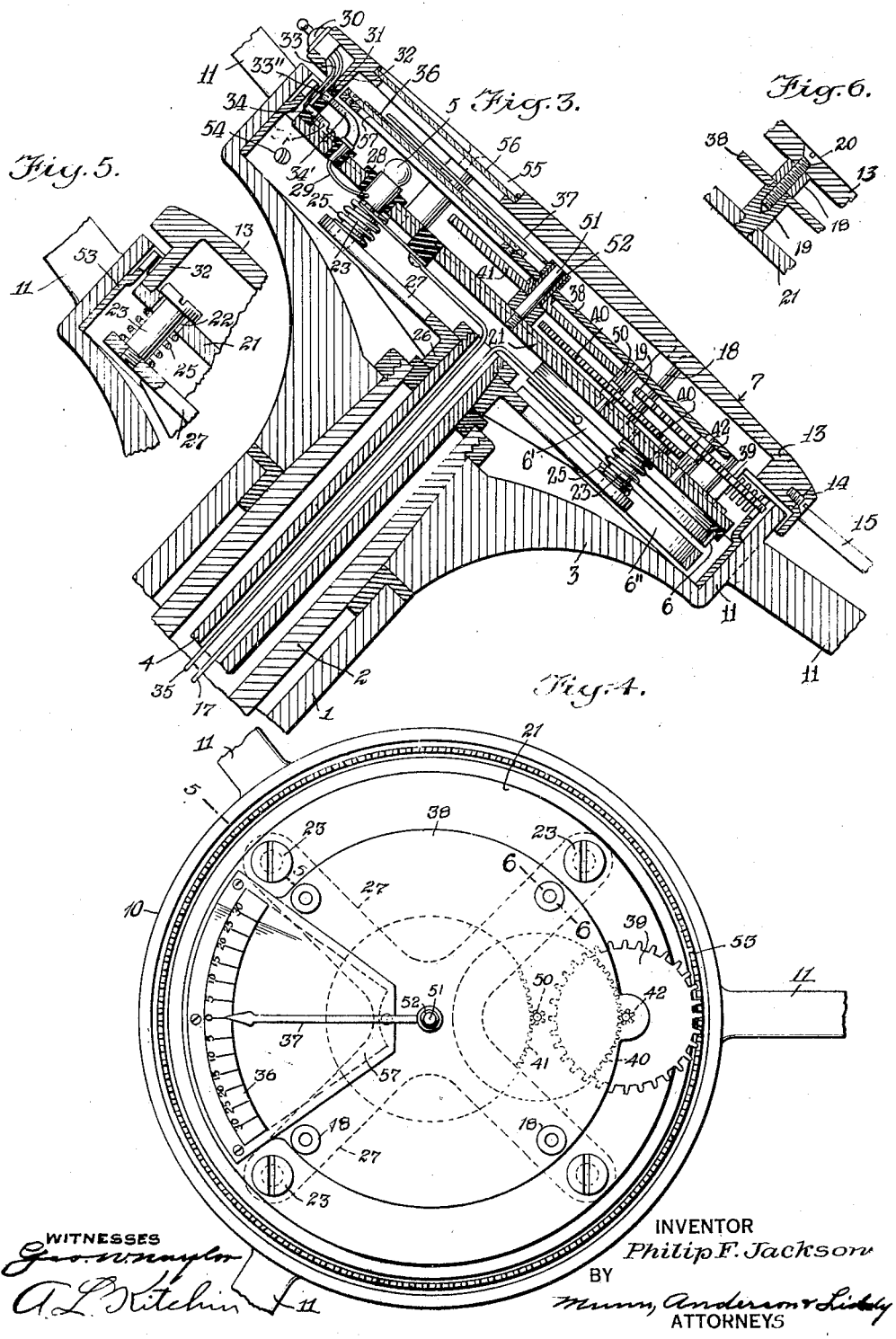

Patented May 5, 1942

2,282,189

UNITED STATES PATENT OFFICE 2,282,189

FRONT WHEEL INDICATOR FOR MOTOR VEHICLES

Philip F. Jackson, New York, N. Y.

Application February 6, 1940, Serial No. 317,473

4 Claims. (Cl. 116—31)

This invention relates to indicators and particularly to an improved indicator for indicating the position of the front wheels of vehicles, especially motor vehicles, an object being to provide a simple, accurate structure for presenting an indication adjacent the driver of an automobile for constantly informing him of the position of the front wheels.

Another object of the invention is to provide an indicator for automobiles and other motor vehicles, which is arranged on the steering column of the automobile in position to be readily seen by the driver at all times.

A further object of the invention is to provide an indicator for indicating the position of the front wheels of an automobile with the structure arranged on the steering wheel without interfering with the horn switch.

In the accompanying drawings—

Fig. 1 is a top plan view of part of the chassis of an automobile, illustrating an indicator embodying the invention applied to the steering wheel;

Fig. 2 is an enlarged view of the steering wheel shown in Fig. 1 and indicator mounted thereon;

Fig. 3 is an enlarged fragmentary sectional view through Fig. 1 approximately on the line 3—3;

Fig. 4 is a plan view of the steering wheel hub with the cap removed;

Fig. 5 is a fragmentary sectional view through Fig. 4 on the line 5—5;

Fig. 6 is a fragmentary sectional view through Fig. 4 on the line 6—6.

Referring to the accompanying drawings by numerals, 1 indicates the ordinary steering post which is stationary, and 2 the usual steering rod or column connected rigidly to the wheel 3 so as to be rotated thereby. Arranged within the steering rod 2 is a stationary tube or member 4, which is adapted to carry the wires to a lamp 5 and also wires from the switch structure 6 to the horn and to the source of electrical supply. The tube 4 is secured to the conventional worm and gear housing fixed to the frame of the running gear. Arranged on the steering wheel 3 is a mechanism 7, hereinafter fully described, for indicating the relative position of the front wheels 8 of an automobile 9, as indicated in Fig. 1. The steering wheel 3 is provided with a tubular center hub 10, having any desired number of radiating spokes or arms 11 connected with a rim 12. The rim 12 is adapted to be grasped and rotated in the usual manner when steering an automobile. The mechanism 7 is partly arranged in the hub 10 and partly extends outwardly therefrom. The outer part or cap 13 is provided with an annular ring 14 held in place by screws or other means and positioned to slidingly and loosely overlap the hub 10. A plurality of spokes 15 extend from the ring 14 and to the outer ends of these spokes is secured an arc-shaped ring member 16, as shown particularly in Fig. 2.

When it is desired to close the circuit of the horn, the cap 13 may be pushed downwardly from any part of the ring member 16 or spokes 15. This will close the circuit of the horn by bringing the contact members 6' and 6" together. The contact member 6' is insulated from all other parts and the contact member 6" is grounded. A conductor 17 is connected with the contact 6' and extends to the horn. From the horn a suitable conductor extends to one side of the source of current while the other side is grounded. By reason of this arrangement whenever members 6' and 6" are brought together, current will be supplied to the horn for producing a sound. The contact 6' may be moved into engagement with contact 6" by pushing downwardly directly on cap 13 or downwardly on spokes 15 or ring member 16.

The downward movement of the cap 13 and associated parts is transferred through the spools 18 and 19, screw 20 and plate 21, as shown in Fig. 6. It will be understood that any desired number of structures as shown in Fig. 6 may be used. The plate 21 may be made of any suitable material, as for instance, metal. This plate is provided with a plurality of apertures 22 as shown in Fig. 5. A headed screw 23 extends through each of the apertures 22 and is screwed into a stationary member 27. A spring 25 normally holds the plate 21 spaced from member 27 so as to maintain the contacts 6' and 6" normally spaced apart. Member 27 may be a disk or it may be a spider structure having a hub 26 and a plurality of arms 27. As shown in dotted lines in Fig. 4, the member 27 is formed as a spider and is provided with four arms so as to accommodate four pins or screws 23. As the member 27 is rigidly secured to the tubular shaft 4, it is held stationary and also plate 21 is held against rotary movement though it is allowed an up-and-down movement.

The lamp 5 is supported in plate 21 by a suitable insulating member 28. A switch 30 is carried by cap 13 and is connected with lamp 5, whereby this lamp may be easily turned on and off. Cap 13 is provided, near switch 30, with a depending web 32 in which is positioned an insulating block 31. Wires 33 extend from switch 30 to metal contacts 33' and 33", which extend through the insulating block 31. A resilient metal brush 34 is secured by a screw or other means to plate 21 and presses against contact 33' to ground one side of switch 31. A metal brush 34' presses against contact 33" and through conductor 29 is electrically connected to one side of lamp 5, the opposite side of the lamp being connected to one side of a source of electric supply through conductor 35. By reason of this construction, switch 30 may be manipulated to open and close the circuit of lamp 5, which lamp when lit will illuminate the dial 36 and pointer 37. An intermediate plate 38 is supported by the structure shown in Fig. 6 and this intermediate plate carries one end of the shafts of gear wheels 39, 40 and 41. The shaft for gear wheel 39 has a pinion 42 rigidly secured thereto meshing with the gear wheel 40, whose shaft has a pinion 50 connected thereto and meshing with the gear wheel 41. A pin 51 has one end screwed into plate 21 and accommodates a sleeve 52 which is rigidly connected to gear wheel 41 and also to the pointer 37. The various gear wheels and pinions described are of the correct proportion to swing the pointer 37 in proportion to the swinging movement of the respective front wheels 8. In different makes of automobiles the relative proportion of these gear wheels will be varied to suit the turning movement of the steering wheel in respect to the front wheels. The gear wheel 39 preferably has rather elongated teeth which continually mesh with a rack 53, which rack is rigidly secured to the hub 10 interiorly thereof by any suitable means, as for instance, screws 54. By reason of this construction, whenever the steering wheel is rotated in one direction or the other, movement will be transmitted to the train of gears described and eventually to the pointer 37 which will move over the scale 36 in proportion to the turning movement of the front wheels 8.

It will be understood that the cap 13 is provided with a window 55 which is supplied with a glass 56 so that the various mechanisms described will be enclosed and protected against accidental injury.

The dial 36 may be made directly on a glass plate 57, or on a separate member secured thereto as shown in Fig. 3. The lamp 5 is arranged beneath the plate 57 so that whenever current is supplied thereto it will illuminate the dial 36, pointer 37, and associated parts.

The arrangement above described for indicating the position of the front wheels of an automobile in regard to the chassis thereof has several advantages, including the advantage of informing the driver as to the relative angle of the front wheels when backing out of a driveway or other place. Also when an automobile is parked, the arrangement is of advantage as it will indicate to the driver the position of the wheels so that the driver may understand more exactly how he must actuate the car to move it from a parked position. In addition, when the front wheels are out of line or when the tire of one of the front wheels is worn somewhat, there will be a certain drift of the car. Drivers prevent this drift by holding the wheels in position for steering the car in a straight line. The action of the front wheels will be indicated by the pointer 37 and the owner of the car at any time may have the front wheels adjusted or the proper size of tires used to prevent this drifting action.

While it is preferable to provide a hollow hub 10, as shown in Fig. 3, it will be evident that this is not essential as the mechanism described could be arranged in a suitable casing and applied to the upper surface portion of any steering wheel provided the shaft 4 and associated parts are properly positioned.

By reason of the construction above set forth, it will be readily seen that the indicator will continually indicate the position of the wheels of the vehicle to which it is attached. In the case of a motor-driven vehicle, the indicator assists the driver in heavy traffic and in parking, as well as giving material assistance to persons learning to drive.

I claim:

1. An indicator of the character described including an indicating structure, a train of gears connected to said indicating structure to cause the same to function, a gear ring continually meshing with one of the gears of the train of gears, a hollow hub rigidly secured to the steering column of a vehicle, means for rigidly securing said gear ring to said hub interiorly thereof, a stationary member extending through said steering column, said stationary member being secured to means fixed on the vehicle frame, a plate arranged in said hub functioning as a support for said indicating structure and train of gears, a plurality of pins carried by said stationary member loosely extending through said plate, and a spring surrounding each of said pins for resiliently spacing said plate from said stationary member.

2. An indicator of the character described including a hollow hub rigidly secured to the steering column of a steerable vehicle and indicating means carried in said hub for indicating the angle of the front wheels of the vehicle, a train of gears for actuating said indicating means, a gear ring secured to said hub and meshing with one of the gear wheels of said train of gears for actuating said indicating means in proportion to the swinging movement of said front wheels, a cap arranged over said train of gears, a segmental wheel rigidly secured to said cap, means for resiliently supporting said cap, train of gears and associated parts, a horn switch provided with a stationary member carried by the frame of the vehicle, and an insulated member connected with said cap so that when said cap is depressed the switch will close the circuit of the horn, a plate for supporting said train of gears and associated parts and stationary means for holding said plate and associated parts against rotation while said hub is rotated.

3. In a device of the character described, a hub connected with the steering column of an automobile, said hub being provided with a steering wheel, a tubular stationary member extending through said column, said stationary member being secured to means fixed on the frame of the automobile, a spider having a plurality of arms rigidly secured to said tubular stationary member, a headed pin secured to each arm of said spider, a plate having an aperture for each of said pins, a spring surrounding each of said pins for forcing said plate against the heads of said pins, a cap carried by said plate, a contact carried by one of the arms of said spider, an insulated contact carried by said plate, a conductor extending from said insulated contact to the horn of the automobile, whereby whenever said plate is depressed the circuit of said horn will be closed, said cap carried by said plate loosely fitting over said hub, a train of gears carried by said plate, a gear ring carried by said hub and meshing with one of the gears of said train of gears, and an indicating structure actuated by said train of gears.

4. In combination, a vehicle steering wheel having a hub, a steering column to which the hub of said wheel is secured, a stationary member extending axially through said steering column, said stationary member being carried by the vehicle frame, a plate arranged within said hub, means resiliently mounting said plate on said stationary member, means carried by said plate operable to indicate the angular disposition of the front ground wheels controlled by said steering wheel, means on said hub which coacts with said indicating means to operate the latter in response to the movement of the steering wheel, a depressor carried by said plate above said hub manually operable to depress said plate, and caution signal means actuated by said plate in response to the manipulation of the depressor.

PHILIP F. JACKSON.